(No Model.)
J. H. DAVIS.
GALVANIC BATTERY.
No. 470,552. Patented Mar. 8, 1892.
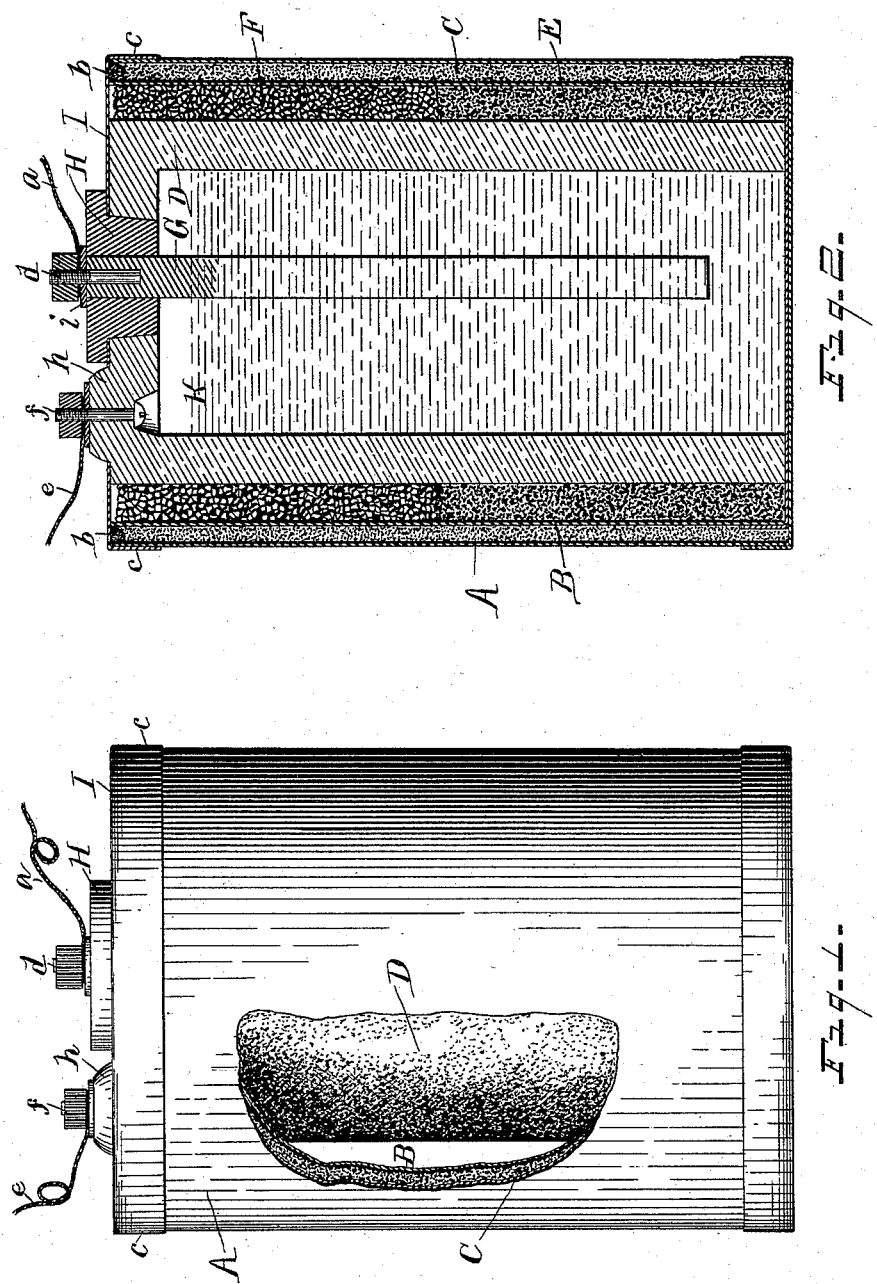

UNITED STATES PATENT OFFICE.

JOHN H. DAVIS, OF DETROIT, MICHIGAN, ASSIGNOR TO THE ELECTRICAL FIBER-CARBON COMPANY, OF SAME PLACE.

GALVANIC BATTERY.

SPECIFICATION forming part of Letters Patent No. 470,552, dated March 8, 1892.

Application filed April 24, 1891. Serial No. 390,224. (No model.)

*To all whom it may concern:*

Be it known that I, JOHN H. DAVIS, a citizen of the United States, residing at Detroit, in the county of Wayne and State of Michigan, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in galvanic batteries; and it consists in a certain construction and arrangement of parts, as hereinafter fully set forth, the essential features of which being pointed out particularly in the claims.

The objects of the invention are to produce a battery that is simple and inexpensive, that is so constructed as to render the battery-jar light and flexible, and in which the arrangement is such that the liquid is kept in continuous circulation through the chemical excitant and in contact with the electrodes of the battery, thereby maintaining a uniform quantity and degree of electric energy. These objects are attained by the arrangement of parts illustrated in the accompanying drawings, in which—

Figure 1 is a side elevation of my improved battery, a portion of the side being broken out to more clearly show the formation of parts. Fig. 2 is a vertical central section through the battery, as when in operation.

Referring to the letters of reference, A designates the outer jar or vessel, which is formed of any suitable flexible material, such as heavy paper properly treated to adapt it to the purpose.

B designates the inner jar or vessel, made of a flexible material similar to that of the outer jar and provided with an interior coating of paraffine or like imperviant to moisture and chemical action. The diameter of the outer jar A is greater than that of the inner jar B, whereby, when the jar B is placed within the jar A, a space is formed between the adjacent walls of said jars. Within this space is placed a filling of sand, sawdust, or like material C, which is confined therein by a packing-strip $b$ at the top, as clearly shown in Fig. 2, whereby a light and flexible vessel is formed, thus obviating the breaking of the jars incident to the employment of glass and earthen jars for this purpose, as commonly practiced.

D designates a hollow bibulous carbon cell or cylinder, which forms the negative electrode of the battery. Said carbon is smaller in diameter than the inner jar B, and is placed centrally within said vessel, its lower end resting upon the bottom thereof. The lower portion of the space between the outer wall of the carbon cell and the jar B to about one-half the distance to the top is filled with sand or like substance E, the upper portion of said space being filled with sal-ammoniac or other suitable excitant F, which rests upon the sand E and is supported thereby.

G designates a zinc bar that forms the positive electrode of the battery. Said bar passes through an insulating-thimble H in the top of the carbon cylinder D and depends within said cylinder, the upper end of said bar being provided with an ordinary binding-post $d$, to which the circuit-wire $a$ is attached.

$f$ designates a binding screw or post secured in the boss $h$ in the top of the carbon cell, and to which is attached the circuit-wire $e$.

I designates the top or cover of the battery jar or vessel, which is composed of the same material as the jar A and is provided with a depending flange $c$, that receives the upper end of said jar, said cover being also provided with openings in the top, through which pass the boss $h$ and thimble H, respectively. It will be seen on looking at Fig. 2 that the upper end of the zinc G is provided with a plate $i$, that bears upon the surface of the thimble H around the opening therein, through which said zinc passes, whereby said zinc is supported, so as to depend freely within the carbon D, and may be readily withdrawn for the purpose of replenishing the zinc or the liquid of the battery without removing the cover I.

The parts being in proper position, as shown in Fig. 2, water is poured into the carbon cylinder D, so as to fill it nearly to the top, as shown at K in said figure. Said carbon being porous, the water percolates through the interstices therein at the top, and comes in contact with the sal-ammoniac or excitant F. The water becoming saturated with said excitant increases in density, causing the solution so formed to gravitate through the sand or porous filling E to the bottom and percolates through the base of the carbon D to the interior thereof, acting upon said carbon and zinc G to produce electro-motive force, as is well understood. By the chemical action of the solution upon the carbon and zinc the density of said solution is decreased, which causes it to gradually rise to the top, its space at the bottom being occupied by the denser portion of the solution that gravitates from the excitant F, whereby a circulation of the solution is effected through the carbon cell, the sal-ammoniac or excitant, and around the zinc bar G, insuring perfect saturation and maintaining the solution at a uniform degree of strength, and by means of this feature of circulation over-saturation is avoided, as saturation can only occur by the circulation of the liquid through the excitant, which circulation is regulated by the exhaustion of the chemical force of the solution and a decrease in its specific gravity caused by contact with the electrodes of the battery, whereby the battery is made self-regulating, obviating the deposition of crystals upon the working surfaces of the electrodes, preventing them becoming sluggish and inert, the result of which is the production of a battery that will last a great length of time and in which there is no diminution of electric energy, effecting economy in the use of materials and obtaining the maximum of electro-motive force for the quantity of material consumed.

Having thus fully set forth my invention, what I claim as new, and desire to secure by Letters Patent, is—

1. In a battery-jar, the combination of the outer flexible vessel, the inner flexible vessel of less diameter than the outer vessel and rendered impervious to moisture, and a filling located between the adjacent walls of said vessels, substantially as set forth.

2. In a battery-jar, the combination of the outer flexible vessel, the inner flexible vessel of less diameter than the outer vessel and having an interior coating of paraffine, and a filling located between the adjacent walls of said vessels, substantially as specified.

3. In a battery, the combination of the battery vessel or jar, the bibulous carbon forming the negative electrode located therein, the excitant supported above the bottom of said jar, the positive electrode, and circulating fluid, substantially as set forth.

4. The combination of the battery-jar, the bibulous electrode therein, the porous filling surrounding said electrode at the base, the sal-ammoniac or chemical excitant surrounding said electrode at or near the top and supported by said filling, the zinc electrode, and circulating fluid, as specified.

5. The combination of the battery-jar, the bibulous cylindrical carbon electrode therein, the porous filling located between the adjacent walls of the carbon and jar at the base, the excitant located between the adjacent walls of the carbon and jar above said filling and supported thereby, the positive electrode depending within said carbon, and the circulating fluid, substantially as specified.

In testimony whereof I affix my signature in presence of two witnesses.

JOHN H. DAVIS.

Witnesses:
JOHN R. MARKLE,
E. S. WHEELER.